United States Patent [19]
Anderson, Jr. et al.

[11] Patent Number: 5,206,493
[45] Date of Patent: Apr. 27, 1993

[54] DOCUMENT READER

[75] Inventors: Robert L. Anderson, Jr., Tigard, Oreg.; James R. Goecks, Camas, Wash.

[73] Assignee: Soricon Corporation, Boulder, Colo.

[21] Appl. No.: 415,622

[22] Filed: Oct. 2, 1989

[51] Int. Cl.⁵ .............................. G06K 13/00
[52] U.S. Cl. .................... 235/475; 235/449; 235/480
[58] Field of Search ............... 235/475, 379, 449, 454, 235/480, 482; 360/2, 88

[56] References Cited

U.S. PATENT DOCUMENTS

| | | | |
|---|---|---|---|
| 3,893,182 | 7/1975 | Schmidt | 360/2 |
| 3,898,687 | 8/1975 | Schmidt | 360/2 |
| 4,228,953 | 10/1980 | Ingram | 235/480 |
| 4,277,689 | 7/1981 | Thomas et al. | 235/482 |
| 4,309,601 | 1/1982 | Nally | 360/2 |
| 4,555,617 | 11/1985 | Brooks | 235/449 |
| 4,772,781 | 9/1988 | Watanabe | 235/480 |

*Primary Examiner*—Harold Pitts
*Attorney, Agent, or Firm*—Rosen, Dainow & Jacobs

[57] ABSTRACT

A document reader for reading manually fed edge coded documents, comprising a first component including a side wall, a second component orthogonally positioned with respect to the first component and having a second sidewall, the first and second sidewalls positioned adjacent one another so as to form a document receiving slot therebetween, the first sidewall containing an opening, a drive means, the drive means positioned within the first component and adapted to project through the first sidewall opening and substantially across the slot, the second sidewall including an opening, reading means contained within the second component, the reading means including a light source, means for directing light from the source through the second wall opening to the document, means responsive to light reflected from the document for converting the reflected light to digital data, control means coupled to the drive means, sensing means positioned proximate to the slot for sensing the precise location of the document, the sensing means coupled to the control means and responsive to the sensed document for controlling the drive of the document past the first and second openings.

2 Claims, 6 Drawing Sheets

DOCUMENT READER

BACKGROUND OF THE INVENTION

1. Field of the Invention

The present invention relates to document readers and more particularly to document readers of increased accuracy, lower price, efficient operation and relatively smaller size than document readers heretofore available.

2. DESCRIPTION OF THE PRIOR ART

Document readers, particularly for reading small documents such as edge coded checks and the like, which are utilized at point of sale or other remote locations, are becoming increasingly desirable in the current commercial environment. Particularly for point of sale devices, the ability to automatically enter account numbers and other information pertinent to credit data of a purchaser, is important for implementing sales. Most commercial applications of readers for reading instruments such as checks have only been available for use in large scale commercial institutions such as banks. Such devices are often large scale automated readers which do not provide for the ability to enter data in real time applications. Also, such devices tend to be extremely large and bulky, and not generally applicable for lower applications. Such devices are often expensive and thus inefficient from the view point of size, space and price requirements for multiple volume small user facilities. In addition, the use of such readers for single entry documents involving the use of operator handling often introduce errors into the documents read due to size and positioning requirements. Data lines for purposes of credit checks of credit card customers are now available at most point of sale locations, thus providing a means by which the entry of data from multiple sources allowing for credit checks and data base information acquisition at remote locations is therefore extremely desirable. The principle requirements for a document reader which may be utilized at a remote point of sale locations and other high volume but small space area therefore include the ability to position the reader in at least two different orientations, as well as occupying a relatively small amount of space. Such a reader must also be relatively efficient in terms of ability to read documents regardless of the position by which the document is inserted into the reader, operate at a relatively high speed and with a minimum of error. Such a reader must also be relatively attractive for use at point of sale locations and must also be relatively inexpensive. Since remote point of sale locations are often difficult environments, such a device must also be capable of operating with a minimum of maintenance and should have a relatively simple construction for as few components as possible, particularly in the document reading path so as to minimize error in reading caused by difficult environments as well as to simplify maintenance problems. In addition, since the invention contemplates hand entry of relatively small documents by an operator, alignment of the read portion of the document must have a maximum leeway so as to minimize entry problems.

SUMMARY AND OBJECTS OF THE INVENTION

Accordingly, it is a principle object of the present invention to provide a document reader capable of relatively error free operation in conjunction with manual operator utilization.

It is another object of the present invention to provide a document reader of relatively small size.

It is a further object of the present invention to provide a document reader capable of operation in multiple orientations.

It is a further object of the present invention to provide a document reader which may be oriented so as to facilitate left hand operation.

The foregoing objects are achieved in accordance with the invention by the provision of a document reader wherein the small dimension advantage is realized by the placement of the drive components, the optical read path and the electronic read components on the same side of the object plane defined by the document. The error rates and maintenance requirements are reduced by providing an optical path which is open, without the use of light pipes, defined optic tubes or clear plastic or glass windows.

In many point of sale applications, input devices such as cash registers or the like are utilized by an operator. Since most operators are right handed, the use of a document reader as an adjunct to such point of sale devices which facilitates or more easily allows the use of the left hand for the insertion of the document provides for greater efficiency and ease of operation, as well as improving the speed at which documents may be entered and thereby facilitate the point of sale operation. Thus, if the point of sale is a retail outlet, and the point of sale device a cash register, and the document or check provided by a customer, the operator may while operating the cash register with the right hand allow for ease of document entry into the document with the left hand so as to provide appropriate data base information entry as well as credit check in a relatively efficient ergonometric manner. The reader is oriented so that the read slot which receives the document is oriented toward the left, thus constituting the reader as a left handed device. This facilitates use at point of sale terminals and in other applications where the operator is interacting with other mechanisms wherein the reader of the present invention is an adjunct.

The drive mechanism is a single drive wheel rather than a double roller providing for improved document positioning as well as reducing the required number of drive components. Specifically, the drive wheel is positioned within a first side wall bordering the object plane and projecting laterally into the object plane, and protruding into an opening on an opposing, second side wall bordering the object plane. The document is positively engaged in a pinching action between the drive wheel and the second side wall opening along its edge, thus allowing for both positive engagement as well as allowing a pivoting motion about a point defined as the contact between the drive wheel and the document. The pivoting action, coupled with an oscillatory movement of the document along the read path thus results in a proper seating of the document along the read path, irrespective of its initial placement by an operator. This will be explained in further detail below. The proper seating places the readable portions of the document in line for the operation of the read sequence. The positive engagement by the drive wheel on the document also permits positive control of the document movement substantially throughout the document length, thereby allowing the read operation to be effective over substantially the entire length of the document in the direction of the read path. The oscillatory movement and document read function are achieved by a pair of sensors positioned on either side of the read opening and cooperating with light. When the first sensor is occluded, the motor drive is engaged to run in the forward direction at half speed. When the document reaches the drive wheel the pinching action creates a positive drive pulling the document out of the operator's hand and toward the second sensor. When the second sensor is occluded the computer controller within the reader then knows the precise location of the document and, by preprogrammed control, drives the document forward at full speed a short predetermined distance. The computer then reverses the motor drive and drives the document backward until its leading edge is almost beyond the engagement point of the drive wheel and the document. At all times the document remains under positive drive control due to the continued presence of the document under the drive wheel. The drive wheel is configured with a unique trapezoidal configuration allowing it to project into the object plane by a greater amount at its lower edge than at its upper edge. This causes the contact between the drive wheel and the document to be at a point rather than along a line or band. As a result, when the document is driven by the drive wheel, a pivoting effect is achieved whereby the document rotates about that pivot and thus becomes properly seated along the drive path for reading at the optical read station. This occurs at the next step in the oscillatory process when the document is driven forward again for reading. At this point, the document is driven all the way through the read station to its farthest dimension as determined by the sensors. Again, the document is not driven past its engagement with the drive wheel so that at all times positive control of the document is maintained. The read operation takes place during this drive operation, dynamically as the document is driven through. At the end of the read operation the document may either be removed by the operator or driven back through the reader to its original point for more convenient removal by the operator.

BRIEF DESCRIPTION OF THE DRAWINGS

The foregoing brief description of the present invention will become more apparent from the following appended figures, wherein.

DETAILED DESCRIPTION OF PREFERRED EMBODIMENTS

Figure 1:
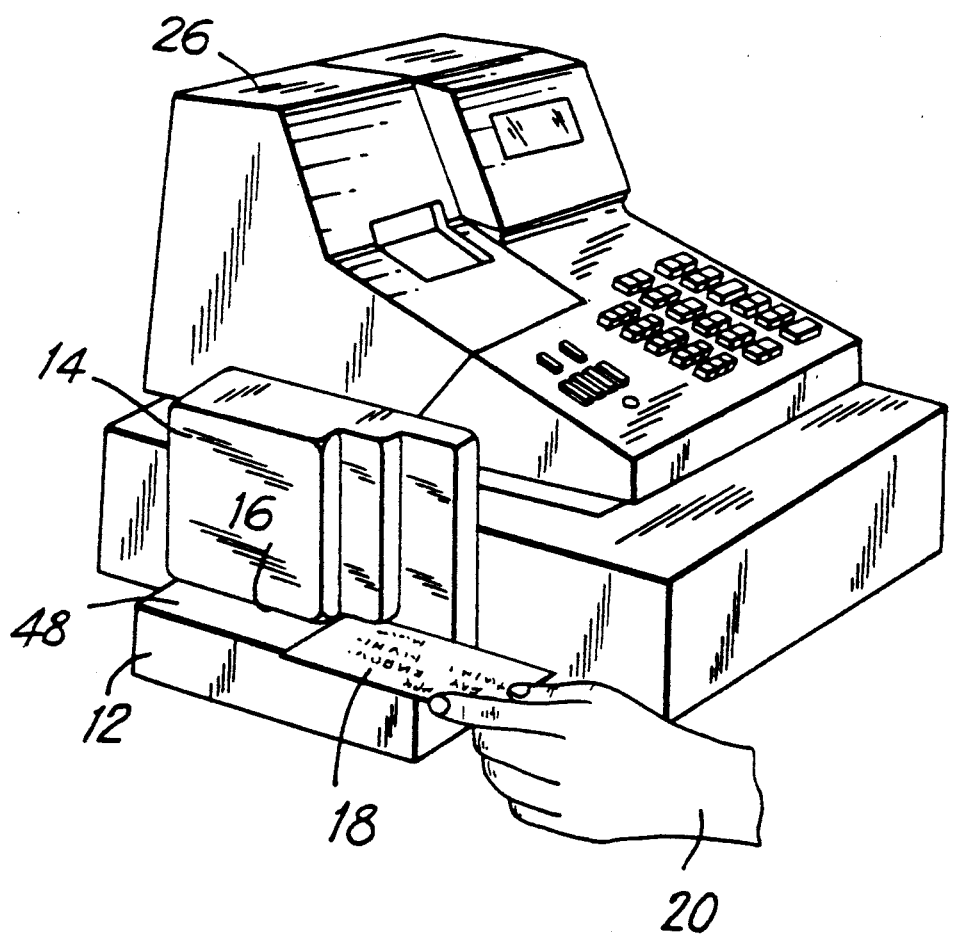
FIG. 1 is a perspective view of the document reader in accordance with the present invention.

Referring to FIG. 1, a perspective view illustrating the document reader of the present invention is shown, along with a detail of the manner in which operator interaction with the document reader is accomplished. Thus, the document reader illustrated generally as 10 is constructed principally of two major components. The first major component 12 is structurally positioned with the second major component 14 so as to provide a slot 16 there between for receiving the document 18 inserted by means of an operator 20. The slot 16 is defined by a first side wall 48 located on the first component 12 and a second side wall 50 located on the second component 14. The document reader 10 is oriented such that it may be placed as an adjunct next to a point of sale device 26, and in either a horizontal or vertical orientation. The orientation shown in the drawing, wherein the document reader is located along the left side of the point of sale device such as a cash register, is considered a horizontal orientation since the document is inserted parallel to the horizontal plane. It will be noted that the document reader 10 may also be orientated such that its second major component 14 may be placed on the support surface, such as on the upper shelf of the point of sale device 26. In this case, the document reader 10 is rotated 90° and the document may be inserted in a vertical manner with the document is parallel to the vertical plane. It will be noted that in either orientation, the document may easily be inserted by the operator in a left hand mode. In operation, the operator inserts the document into the slot a predetermined distance until an appropriate mechanism to be described in further detail below secures the document and causes it to be moved through an appropriate reader station. This causes the data from the document to be electronically translated into an appropriate information for transmission to a suitable receiving means, such as a data base, telephone transmission for credit check, or other data reception and utilization devices. It will be understood that one or two way communication is possible, as well as local operation, within the skill of practitioners in the art.

Figure 2:
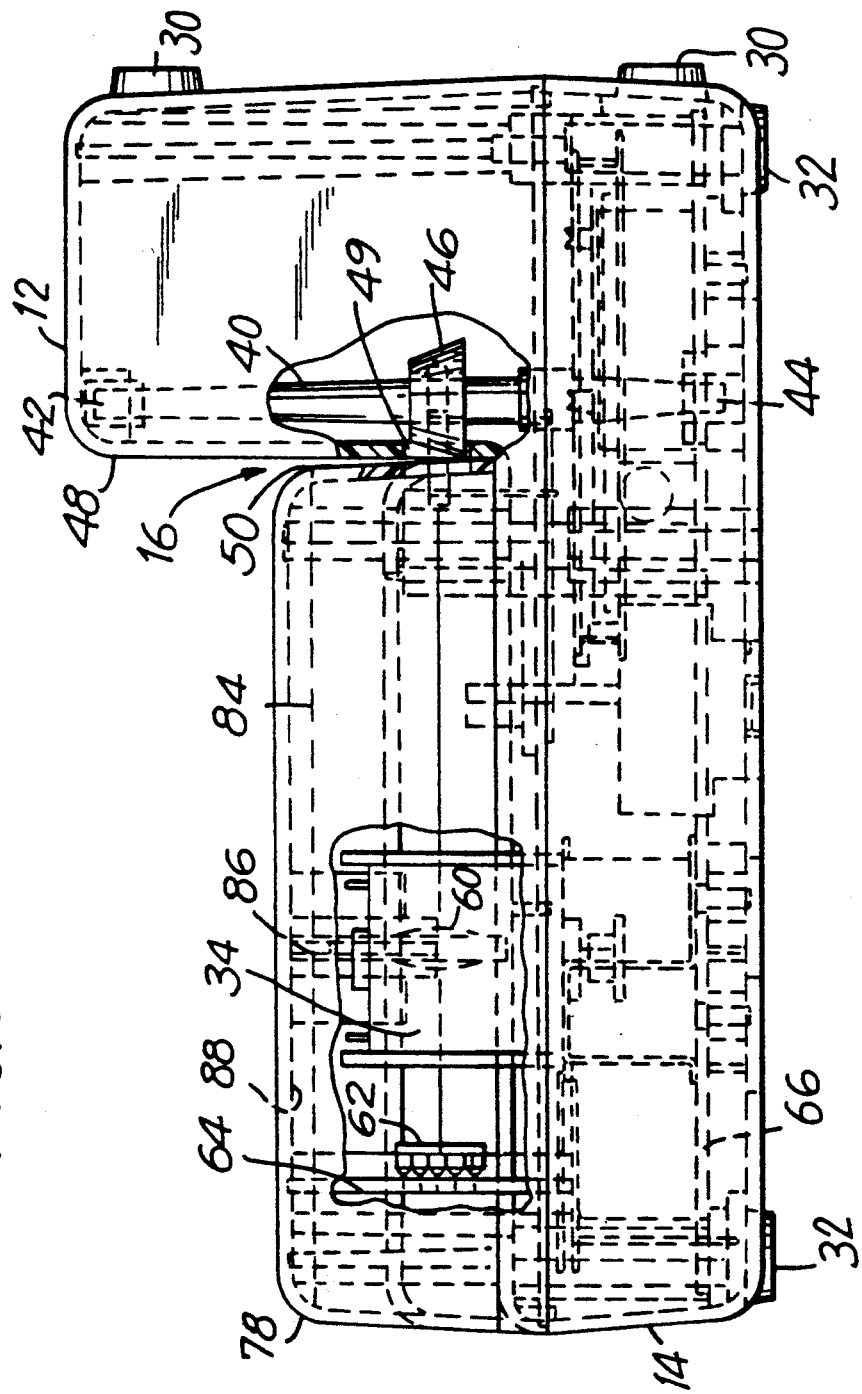
FIG. 2 is a side view in cut away form illustrating various principle components of the present invention.

Referring to FIG. 2 there is shown a rear view of the document reader illustrated in FIG. 1. For purposes of illustration, like reference numerals are used to refer to like components. Thus, as shown through the side view first component portion 12, is shown in a configuration reversed from that shown in FIG. 1. A plurality of a supporting means 30 support the reader when placed in its horizontal configuration. As shown in this view, the reader is in a vertical configuration, and supported by supporting means 32. These supporting means are typically rubber feet or the like.

Figure 6:
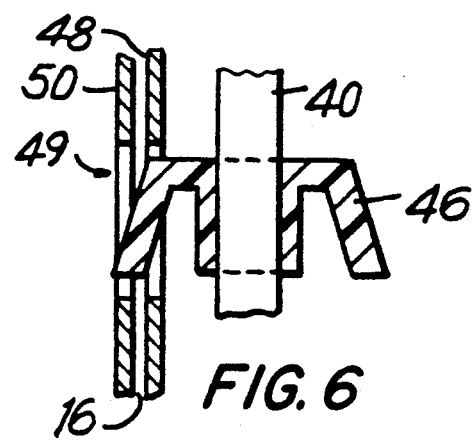
FIG. 6 is a detail illustration of a structural feature implementing the document movement through the read station of the present invention.

Several of the more critical segments are shown in partial cross-sections through the view shown in FIG. 2. This view should be taken in conjunction with FIG. 3 which shows a top view of the components shown in FIG. 2. A slot area 16 contains both sensor and drive mechanisms for driving the document into read configuration therethrough. Thus, the main drive mechanism is a drive motor 34 mounted by means of a suitable pulley drive 36 to a tooth wheel 38 which in turn is mounted to a shaft 40 appropriately journaled into bearings 42 and 44 at opposing ends thereof. A drive wheel 46 is positioned on the drive shaft 40 for engagement with the document. The document in the slot 16 defines an object plane. For purposes of explanation, it will be assumed that the object plane is an imaginary line flush with side wall 50 of the slot 16. For purposes of driving the document, the drive wheel 46 extends through the side wall 48 of the first component section 12 and partially through the side wall 50 of the component section 14. As illustrated in FIG. 6, the drive wheel is shaped as a trapezoid, with its smaller dimension higher and larger dimension lower than the long axis of the drive shaft 40. This will be explained in further detail below. With more specific references in FIG. 3, the document read operation is effected by means of an optical read sequence, wherein the optical path is defined by means of a light source, lens and CCD. More specifically, a light source, consisting in this case of two individual light sources 50 and 52 are positioned within reflective walls 54 which contain an opening 56 therebetween. In operation, light generated by the light source is reflected by the mirrors 54 onto the document 18 which is driven through the slot 16 along the object plane and impinges upon the light path. A reflection of information from the document is defined by the light beam 58 and directed to lens 60. Light from lens 60 is then directed towards a CCD 62 which is contained on a circuit board 64 and which in turn is coupled through appropriate circuitry to a further circuit board 66 which contains the electronic components and microprocessor for processing the information received from the document. It should be noted that by placement of the optical source and detectors, as well as the drive motor on the same side of the object plane defined by the document, result in substantial reduction in size of the document reader. The optical path defined by the reflection is free of any components other than air and as a result is substantial improvement in maintenance and other interference problems normally caused by the use of bulky devices such as optical tubes or windows are avoided.

Figure 3:
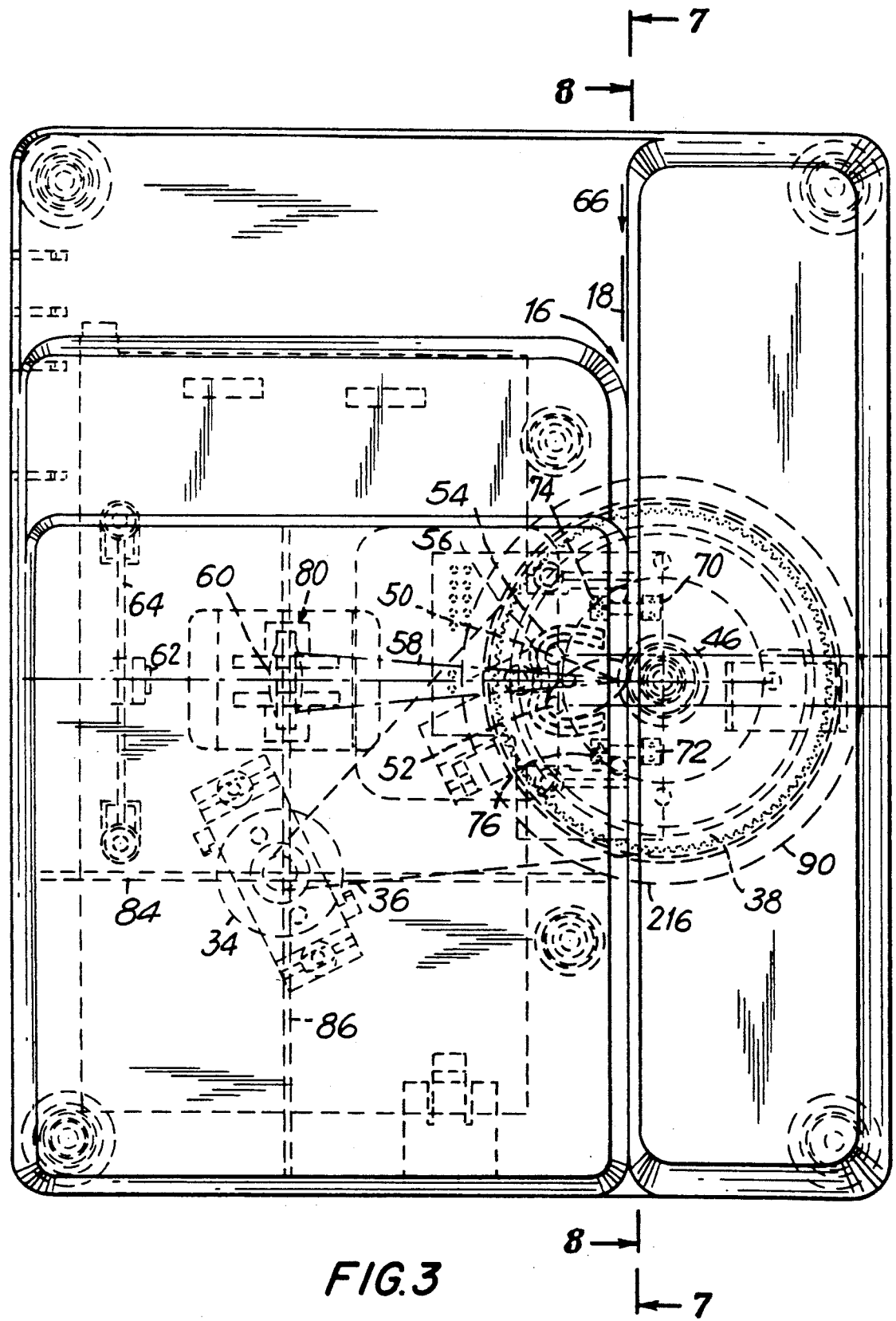
FIG. 3 is a top view of the document reader showing appropriate placement of the various components of present invention.
Figure 4A:
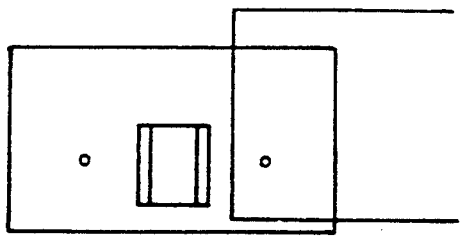
FIG. 4 A through G illustrates sequence of steps implemented by the present invention in reading a specific document.
Figure 4E:
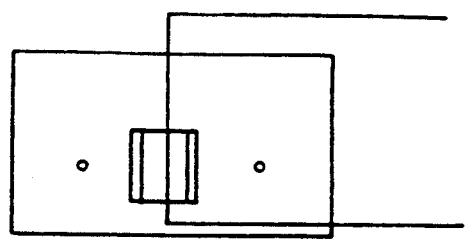
Figure 4B:
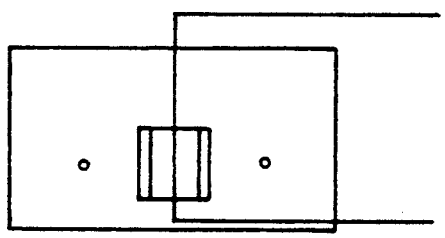
Figure 4F:
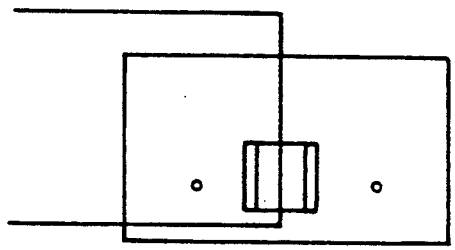
Figure 4C:
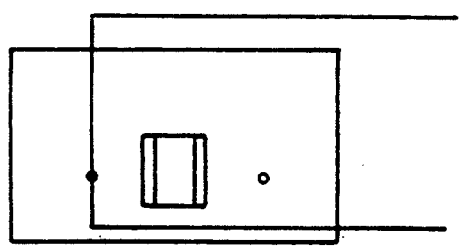
Figure 4G:
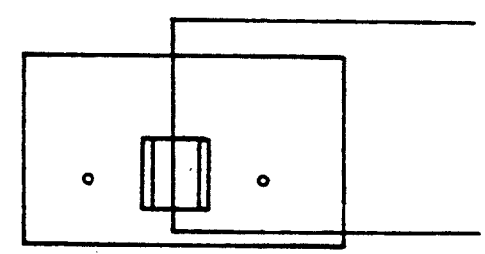
Figure 4D:
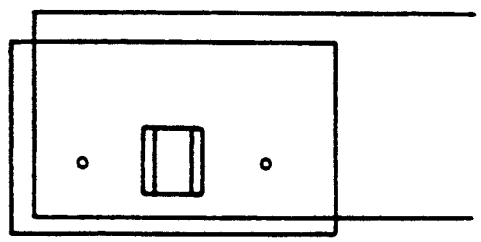

The document drive direction, shown in respect to FIG. 3, is in the direction indicated by the arrow 66. This orientation provides for a left handed operation of the document reader thus constituting the reader as a left handed device. This particularly facilitates use of point of sale terminals and another applications where the operator is interacting with other mechanisms wherein the reader of the present invention may be used as an adjunct.

The drive mechanism is a single drive wheel rather than a double roller providing for improved document positioning as well as reducing the required number of drive components. Specifically, the drive wheel is positioned within a first side wall bordering the object plane and projecting laterally into the object plane, and protruding into an opening on an opposing, second side wall bordering the object plane. The document is positively engaged in a pinching action between the drive wheel and the second side wall opening along its edge, thus allowing for both positive engagement as well as allowing a pivoting motion about a point defined as the contact between the drive wheel and the document. The pivoting action, coupled with an oscillatory movement of the document along the read path thus results in a proper seating of the document along the read path, irrespective of its initial placement by an operator. This will be explained in further detail below. The proper seating places the readable portions of the document in line for the operation of the read sequence. The positive engagement by the drive wheel on the document also permits positive control of the document movement substantially throughout the document length, thereby allowing the read operation to be effective over substantially the entire length of the document in the direction of the read path. The oscillatory movement and document read function are achieved by a pair of sensors 70 and 72 positioned on either side of the read opening and cooperating with light 74 and 76. When the first sensor 70 is occluded, the motor drive 34 is engaged to run in the forward direction at half speed. When the document reaches the drive wheel 46 the pinching action creates a positive drive pulling the document out of the operator's hand and toward the second sensor. When the second sensor is occluded the computer controller within the reader then knows the precise location of the document and, by preprogrammed control, drives the document forward a short predetermined distance. The computer the reverses the motor drive and drives the document backward until its leading edge is almost beyond the engagement point of the drive wheel and the document. At all times the document remains under positive drive control due to the continued presence of the document under the drive wheel. The drive wheel is configured with a unique trapezoidal configuration, shown in FIG. 6, allowing it to project into the object plane by a greater amount at its lower edge than at its upper edge This causes the contact between the drive wheel and the document to be at a point rather than along a line or band. As a result, when the document is driven by the drive wheel 46, a pivoting effect is achieved whereby the document rotates about that pivot and thus becomes properly seated along the drive path for reading at the optical read station. This occurs at the next step in the oscillatory process when the document is driven forward again for reading. At this point, the document is driven all the way through the read station to its farthest dimension as determined by the sensors. Again, the document is not driven past its engagement with the drive wheel so that at all times positive control of the document is maintained. The read operation takes place during this drive operation, dynamically as the document is driven through. At the end of the read operation the document may either be removed by the operator or driven back through the reader to its original point for more convenient removal by the operator.

With reference to FIG. 3, increased structural rigidity is provided within the upper portion 78 of the second component portion 14. As shown in FIG. 3, the lens 60 is secured within a plurality of upright frame members 80 in a manner whereby the lens is secured and positioned accurately with respect to the reflected light beam 58. The upright frame members 80 are also positioned properly with respect to the image surface of the CCD 62 for appropriately reading the reflective image. Increased rigidity is provided by a plurality of cross frame members 84 and 86 and which travel across the inner upper surface 88 of the upper portion 78 of the second component portion 14. This increased structural rigidity adds to the stability for hostile environments often encountered in point of sale locations.

Figure 7:
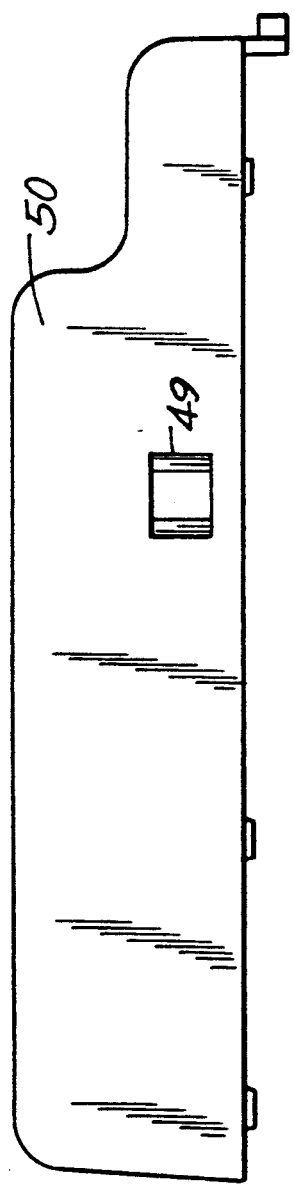
FIG. 7 is a sectional view taken through FIG. 3.

Referring to FIG. 4 A through G, the sequence of operations illustrating the manner in which the document is passed through the reading station is illustrated. In this Figure the view is taken parallel to the object plane, and shows the location of the window and sensor locations, and presumes the document is being entered from the viewer's right. Thus, FIG. 4A, the document is placed into the document slot, as was shown in FIG. 1. As the operator passes the document into the station, the first sensor within the document reader becomes occluded, thereby starting the drive motor. The operator continues to pass the document into the reader toward the read station, until as shown in FIG. 4B the document is captured of means of the drive wheel, illustrated in FIGS. 2 and 3. This action is shown as occurring along the center line of the read station. Since the occlusion of the first sensor caused the motor drive to begin rotation, at a relatively slow speed, such as for example ½ speed, the capturing of a document in the second position of FIG. 4B occurs as soon as the document impinges upon its initial contact point between the drive wheel and the opening defined in the opposing side wall. Since, as was explained above, the drive wheel has a trapezoidal cross sectional configuration, the initial contact between the document and the drive wheel is a point contact in proximity to the lower edge of the document. This point contact, coupled with the positioning of the point contact below the center line of the document, causes a movement of rotation about the point contact in direction of document movement. Thus, as the document enters the reader from the viewer's right, moving towards the left, at the moment of impingement of the document with the drive wheel, a rotation in the clockwise direction as viewed from the observer occurs in the document. Thus, if the document were inserted at a slightly elevated angle, a not unnatural position in view of the operator's position with respect to the reader, any slight angular elevation would be compensated and the document would be rotated until it seats along the lower edge of the slot opening. This action occurs as the document moves toward the left from FIGS. 4B through 4C. In FIG. 4C, the document has reached the second sensor, occluded same, and thereby registering a precise document position with the data processor to which the sensor mechanisms are coupled. In accordance with the prestored program in the microprocessor, the document is then driven in the same direction FIG. 4D for a predetermined distance, which for a standard size check would be approximately another inch or inch and a half. At this point, the motor reverses and the document is driven back into the direction in which it was originally entered, from the viewers perspective towards the right, until it reaches the position shown in FIG. 4E. The document is driven until it reaches its farthest limit without breaking the engagement between the drive wheel and the document. Thus the document is also kept under positive control by means of the drive wheel contact with the document. When the document has reached its farthest point while still maintaining positive control, FIG. 4E, the motor again reverses, driving the document back into the position in which it was originally inserted and this time the document is driven all the way through the read station, FIG. 4F, and the reading operation takes place. This motion designated as a shuttle motion, is designed to further improve the alignment of the readable portions of the document with the read station to further ensure the maximum possible alignment of the reading characters with the read station. At this point in FIG. 4F, the document may be removed by the operator or, optionally, the motor may be reversed after a completed read operation and the document driven all the way back through the reader to its original entry point, 4G, for greater ease of removal by the operator. Rotation of the document by means of the point contact below the center line occurs as a result of the differential drag effect occurring when the document is driven below its center line as well as by the effect of a point contact on the document. By making the drive wheel trapezoidal shape, the point contact is achieved. As will be explained further below, the drive wheel is created its trapezoidal shape and position so that portions of the drive wheel project through the object plane into the opening formed in the opposing side wall of the document reader. In addition to the trapezoidal shape, the drive wheel is constructed such that it has greater resilience for improving document drive contact forces at its lower edge. This results from the umbrella-like construction wherein a center core is provided with an outer layer in circumferentially position with regard to the center core, the outer layer being a drive surface, and coupled to the center core along its top edge at the smaller diameter configuration of the trapezoidal shape. This novel and unique construction coupled with the positioning of the trapezoidal drum through the object plane for improving of point contact, provides both maximum drive force with minimum contact with the document, thus allowing a maximization of the differential drag effect and point rotation which facilitates the document rotation as it is passed through the reader in the shuttle motion in order to ensure appropriate alignment of the read station with the readable character information positioned along the document edge. Referring to FIG. 7, to further facilitate document handling at this position, the opposing wall 50 contains an opening 49 through which the lower edge of the trapezoidal drive wheel may project. This opening includes bevelled edges along its up stream and down steam lateral sides which further facilitate the document controlling effect in the form of a pitching action for positive document control. A specific advantage of this nonstructural configuration is that a second drive wheel, which is a conventional driving mechanism, is not required. Thus, the document is driven in which only a single wheel, utilizing the resiliency of the document itself with positive pressure occasioned by the use of the back support wall as defined by the openings therein. Document control is achieved in this manner and document is controlled maintained in a positive force throughout the entire shuttling and reading operation during which the document is maintained in the reader station. It should be noted that while the shuttle motion has been described as a double back and forth motion, it is possible that correct orientation initially will not require this motion and the reader will operate with a straight through reading path. Other combinations of movement are also possible, however the shuttle motion described above is preferable.

Figure 5:
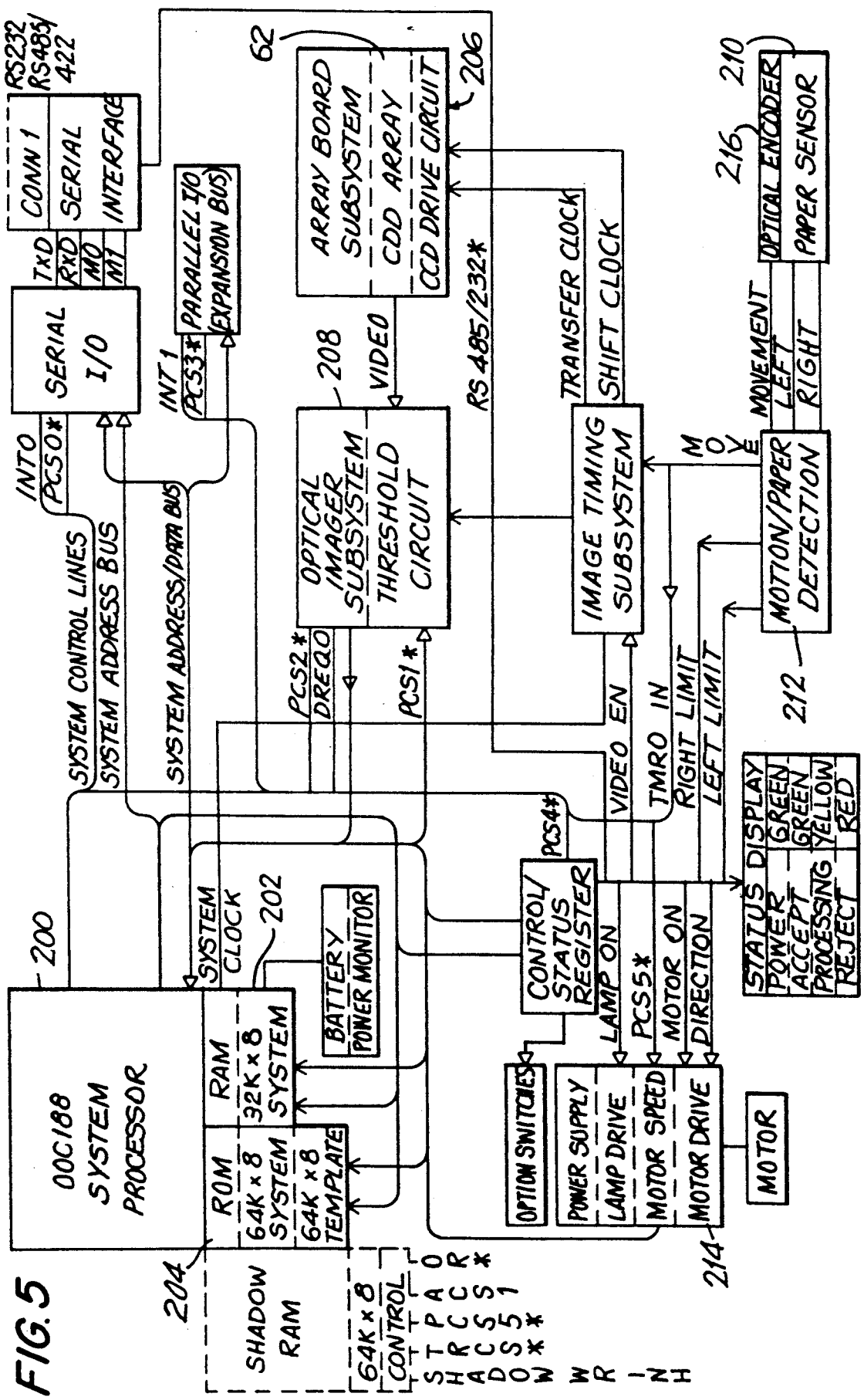
FIG. 5 is an electronic block diagram illustrating the principal components of the reader.

With reference to FIG. 5 a block diagram illustrating the general operation of the reader is shown. The reader operation is controlled by microprocessor 200, including appended RAM memory 202 and ROM memory 204. The ROM contains a prestored program for manipulating the data generated through the read operation as well as controlling the operation of the motor drive. The read operation provides for characters read by the CCD 62 using drive circuitry 206 to be processed in the optical imaging subsystem 208 for use by the microprocessor 200 in a conventional manner. The components shown in FIG. 5 are standard components utilized for optical character recognition and need not be further described. The motor control functions are determined in accordance with timing control which is preferably software generated although discrete timing circuitry under control of the sensor detection may also be employed. The document sensor 210, which is preferably optical, is coupled to a motion detector 212, which in turn generates preset dimensional left and right movements limits. These limits may be set at any desired level depending on the dimensions of the document being scanned. These signals are in turn coupled to drive control circuits 214 which in turn control the document movement.

Referring to FIG. 6, a detail of the manner by which the drive wheel 46 drives the document defining the object plane is illustrated. Thus, the drive wheel 46 which may be composed of suitable high friction material such as neoprene rubber is designed with a trapezoidal cross-section being secured at the upper portion thereof and expanding downward and outwardly in a free or unattached manner from the central shaft or core portion thereof. The positioning of the drive 46 is such that it penetrates wall 48 of its enclosure and extends on an angle until a portion thereof extends at least partially through the second wall 50 of the window 49. The document defining the object plane passes through the slot 16 until the turning drive wheel 46 secures same and pulls it forward, in the manner described upon. Face views of the walls 40 and 58 are illustrated in detail in FIGS. 7 and 8. Thus, the trapezoidal shape of the drive wheel 46, as well a the manner wherein the upper portion thereof is relatively secure through the top and the bottom portion thereof more flexible due to its spacing through the central core portion is thus illustrated for the provision of a novel and unique mechanism whereby the document may not only be driven but also be properly positioned in a simultaneous operation as was explained above in conjunction with FIG. 4A through G.

Figure 8:
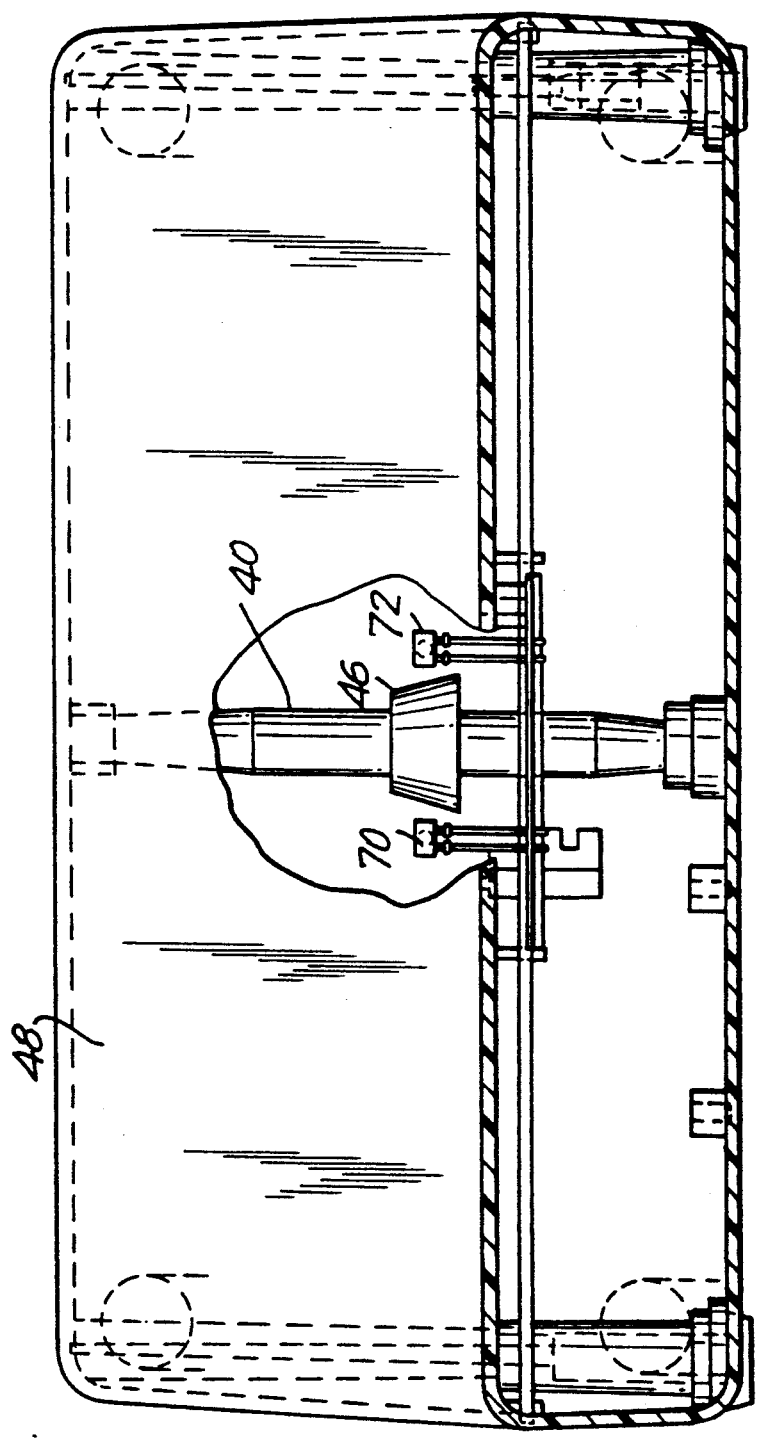
FIG. 8 is a sectional view taken through FIG. 3.

FIG. 7 refers to a view taken along line 88 shown in FIG. 3, and FIG. 8 shows a view to the object plane taken along the lines 77 of FIG. 3. Thus, with reference to FIG. 7, the bevelled edge open window of the upper portion 78 of the second component portion 14 is illustrated, and with regard to FIG. 8 the drive wheel 46 position on the drive shaft 40 and this relation to the window opening 49 is shown.

Thus, although the invention has been described with reference to a check reader, it will be apparent that other documents may be read in accordance with the invention. Also, although edge coded documents have been disclosed, positioning the read station at other areas of the document is also possible, as is using multiple read stations positioned as desired. Other variations and modifications will be apparent to those skilled in the art and the invention should be thus construed in view of the appended claims.

What is claimed is:

1. A document reader for reading a document, comprising a document transport station and a read station, said read station positioned to read said document as it is driven along a predetermined direction, by said transport station, thereacross along a linear path, said transport station including drive means, said drive means including means to compensate for any nonlinearity in said document position by rotation of said document during transport prior to said reading of said document, said drive means comprises a drive wheel positioned to engage said document below the center line thereof and at an angle with respect to the plane of said document, said document undergoes a moment of rotation with respect to said predetermined direction so as to place said document in proper alignment with the read station for traversing said linear path, said drive wheel has a trapezoidal cross-sectional configuration, having a larger dimension at its lower circumference than at its upper, its lower circumference projecting further into the object plane than said upper circumference.

2. A document reader for reading a document, comprising a document transport station and a read station, said read station positioned to read said document as it is driven along a predetermined direction, by said transport station, thereacross along a linear path, said transport station including drive means, said drive means including means to compensate for any nonlinearity in said document position by rotation of said document during transport prior to said reading of said document, said drive means initially drives said document in a first forward direction to a first position, means for sensing the position of said document, control means responsive to said sensing means, said control means responsive to the position of said document for reversing the direction of said document and driving said document in a second reverse direction by a predetermined distance, said control means further responsive to the position of said document for again reversing the direction of said drive means, thereby again driving said document in the forward direction, whereby such bidirectional motion compensates for misalignment of said document along the drive path for increasing the accuracy of the reading thereof, said drive wheel has a trapezoidal cross-sectional configuration, having a larger dimension at its lower circumference than at its upper, its lower circumference projecting further into the object plane than said upper circumference.

* * * * *